United States Patent [19]
Sayer et al.

[11] Patent Number: 5,770,237
[45] Date of Patent: Jun. 23, 1998

[54] METHOD AND APPARATUS FOR PRODUCING AN INJECTION MOULDING OF PLASTICS MATERIAL USING GAS ASSISTANCE AND A VALVE TO CONTROL THE GAS SUPPLY PASSAGE

[75] Inventors: Matthew Emmett Sayer, Marlow; Kenneth Richard Crow, Northfield, both of United Kingdom

[73] Assignee: Cinpres Limited, Staffordshire, United Kingdom

[21] Appl. No.: 755,624

[22] Filed: Nov. 25, 1996

Related U.S. Application Data

[63] Continuation of Ser. No. 331,579, filed as PCT/GB93/01008 May 18, 1993 published as WO93/23228, Nov. 25, 1993, abandoned.

[30]    Foreign Application Priority Data

May 18, 1992  [GB]   United Kingdom ................... 9210607

[51] Int. Cl.⁶ .................................................. B29C 45/03
[52] U.S. Cl. .......................................... 425/130; 264/572
[58] Field of Search ............................. 264/572; 425/130

[56]              References Cited
              U.S. PATENT DOCUMENTS

| | | |
|---|---|---|
| 2,175,053 | 10/1939 | Ferngren .................................. 264/539 |
| 4,474,717 | 10/1984 | Hendry . |
| 4,555,225 | 11/1985 | Hendry . |
| 4,740,150 | 4/1988 | Sayer . |
| 4,917,594 | 4/1990 | Gellert et al. . |
| 4,923,666 | 5/1990 | Yamazaki et al. . |
| 5,101,858 | 4/1992 | Klotz . |
| 5,127,814 | 7/1992 | Johnson et al. ........................ 264/572 |
| 5,162,230 | 11/1992 | Ziegler et al. ......................... 264/572 |
| 5,364,252 | 11/1994 | Hlavaty et al. ........................ 264/572 |
| 5,466,141 | 11/1995 | Eckardt et al. ........................ 264/572 |

FOREIGN PATENT DOCUMENTS

| | | |
|---|---|---|
| 0283207 | 9/1988 | European Pat. Off. . |
| 0390068 | 10/1990 | European Pat. Off. . |
| 0435025 | 12/1990 | European Pat. Off. . |
| 3936289 | 5/1991 | Germany . |
| 2202181 | 8/1988 | United Kingdom . |
| 2217644 | 11/1989 | United Kingdom . |

*Primary Examiner*—Catherine Timm
*Attorney, Agent, or Firm*—Beveridge, DeGrandi, Weilacher, Young, LLP

[57]              ABSTRACT

The production of an injection moulding of plastics material that includes introducing a supply of plastics material through one or more openings in a mould space, and introducing by way of at least one gas supply passage, a pressurized gas through a separate opening in the mould space into the plastics material within the mould space whereby the gas creates a gas containing cavity in the plastics material. An opening and closing of the gas supply passage is controlled by a valve which is opened by the pressurized gas with the valve featuring a valve port at the outlet end of the gas passage, and a movable valve member extending longitudinally of the gas passage for opening and closing the valve port. The valve member at least when in its extended or valve port open position, protrudes into the mould space and penetrates the plastics material to assist the gas in entering the plastics material. Also, with the valve member in its withdrawn or valve port closed position, plastics material is shut off from entering the end of the passage from the mould space.

12 Claims, 2 Drawing Sheets

METHOD AND APPARATUS FOR PRODUCING AN INJECTION MOULDING OF PLASTICS MATERIAL USING GAS ASSISTANCE AND A VALVE TO CONTROL THE GAS SUPPLY PASSAGE

This application is a continuation, of a application ser. No. 08/331,579, filed Nov. 1, 1994, now abandoned which application is a national stage filing of PCT/GB93/01008 filed May 18, 1993, published as WO93/23228, Nov. 25, 1993, each of which are entirely incorporated herein by reference.

FIELD OF THE INVENTION

This invention relates to a method and apparatus for providing an injection moulding of plastics material.

BACKGROUND DISCUSSION

British Patent Specification No. 2202181 describes and claims an apparatus for producing an injection moulding of plastics material comprising means for introducing plastics material into a mould space through one or more openings. Means are also provided for introducing through a separate opening in the mould space a pressurised gas into the plastics material filling the mould space, whereby the gas creates a gas containing cavity in the plastics material, and for thereafter relieving the gas pressure within the gas containing cavity before the mould is opened. The gas supply/pressure relieving means comprises at the separate opening a valve port opening directly into the mould space, a valve member for opening and closing the valve port, and means to supply pressurised gas to the mould space. In operation, the gas supply means is arranged to supply gas through the valve member whilst the valve member is in a valve port closed position, to create the cavity. After the moulding operation has finished, the supply of pressurised gas is terminated and pressurised gas in the cavity in the moulding is vented to the atmosphere by movement of the valve member to a valve port open position. The mould is then opened.

In a preferred embodiment the pressurised gas enters the plastics material through a first passageway in the valve member. Venting of the pressurised gas from the cavity is performed through a second passageway to the atmosphere, the cavity being connected to the second passageway by withdrawing the valve member from the valve port closed position to the valve port open position. The first and second passageways converge at the opening through which the gas enters the mould space. The valve member is connected to the piston of a piston and cylinder for moving the valve member between its closed and open positions, and is positioned in the second passageway so that when the valve member is withdrawn the pressurised gas passes around the valve member into the second passageway and thereby to the atmosphere. The outlet end of the first passageway in the valve member is defined by a screw on cap containing a non-return valve comprising a captive ball. However, downstream of the ball, there is a short length of the first passageway into which plastics material can enter and which must be cleared by the pressurised gas before the gas penetrates the plastics material to form the cavity.

SUMMARY OF THE INVENTION

According to the invention there is provided a method of producing an injection moulding of plastics material comprising introducing a supply of plastics material through one or more openings in a mould space, introducing by means of at least one gas supply passage a pressurised gas through a separate opening in the mould space into the plastics material filling the mould space whereby the gas creates a gas containing cavity in the plastics material, opening and closing of the gas supply passage being controlled by a valve which is opened by the pressurised gas, and thereafter relieving the gas pressure in the cavity before opening the mould, wherein the valve comprises a valve port at the outlet end of the gas passage, and the method includes employing a valve member extending longitudinally of the gas passage and movable between extended and withdrawn positions for opening and closing the valve port respectively, which valve member at least when in its extended or valve port open position protrudes into the mould space and penetrates the plastics material thereby assisting the gas to enter the plastics material to create the gas containing cavity therein, and whereby with the valve member in its withdrawn or valve port closed position plastics material is shut off from entering the end of the passage from the mould space.

The pressure of the gas preferably moves the valve member into its extended or valve port open position and also maintains the valve member in its extended position.

Preferably the valve member protrudes into the mould space also when in its withdrawn or valve port closed position.

The valve member is preferably spring urged into its valve port closed position.

The invention also provides an apparatus for producing an injection moulding of plastics material comprising means for introducing a supply of plastics material through one or more openings in a mould space, at least one gas supply passage for introducing a pressurised gas through a separate opening in the mould space into the plastics material filling the mould space whereby the gas creates a gas containing cavity in the plastics material, the gas pressure within the cavity thereafter being relieved before the mould is opened, and a control valve for opening and closing the gas supply passage, the valve being opened by the pressurised gas, wherein the valve comprises a valve port at the outlet end of the gas passage and a valve member extending longitudinally of the gas passage which is movable between extended and withdrawn positions for opening and closing the valve port respectively, which valve member at least when in its extended or valve port open position protrudes into the mould space and penetrates the plastics material thereby assisting the gas to flow into the plastics material to create the gas containing cavity therein, and whereby with the valve member in its withdrawn or valve port closed position plastics material is shut off from entering the end of the passage from the mould space.

The valve member preferably has a head for closing the valve port, the head being tapered to assist the valve member to penetrate the plastics material.

A spring is preferably provided which urges the valve member into its valve port closed position.

Preferably the valve member when in its valve port closed position engages a stop whereby the plastics material filling the mould space cannot retract the valve member further into the gas supply passage.

In the preferred embodiment of the invention the gas supply means is combined with means for relieving the gas pressure within the gas containing cavity before the mould is opened, said combined gas supply/pressure relieving means comprising at said separate opening a second valve port opening directly into the mould space, and a second valve member for opening and closing the second valve port, said second valve member containing said gas supply passage through which gas enters the mould space whilst the second valve member is in a position closing the second valve port, the second valve member subsequently being moved to open the second valve port to effect venting of the cavity through a second passage to the atmosphere due to movement of the second valve member to open the second valve port.

Preferably said first and second passages converge at the opening through which the gas enters the mould space. The second passage preferably contains the second valve member whereby when the second valve member is opened the pressurised gas passes around the second valve member into the second passage and thereby to the atmosphere.

It is also preferred that the second valve member is connected to the piston of a piston and cylinder for moving the second valve member between its valve port closed and valve port open positions.

BRIEF DESCRIPTION OF THE INVENTION

By way of example, a specific embodiment in accordance with the invention will be described with reference to the accompanying drawings in which.

DETAILED DESCRIPTION OF THE INVENTION

Figure 1:
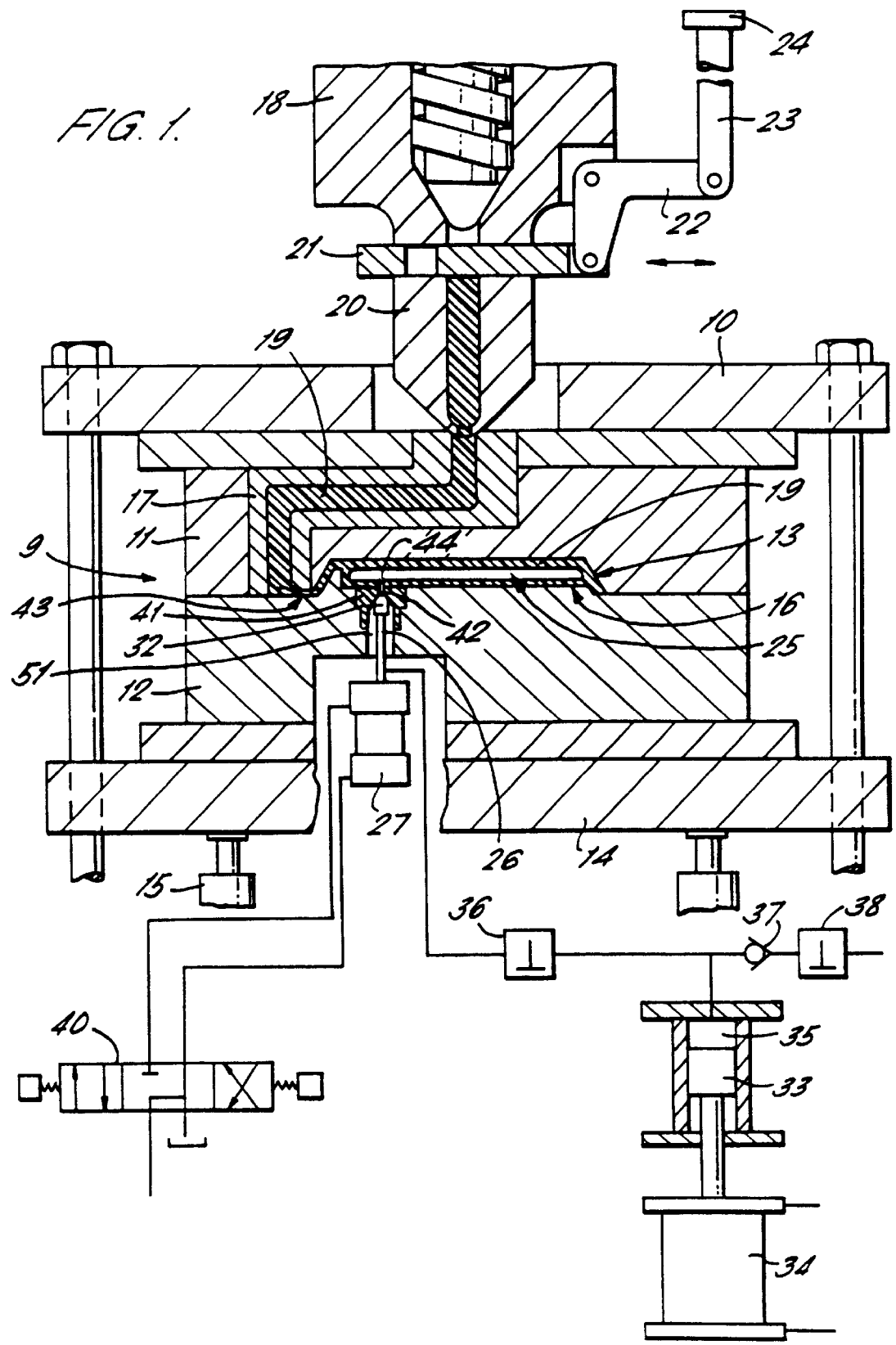
FIG. 1 shows an injection moulding machine having a hot runner manifold.

This example concerns an apparatus for producing injection mouldings of plastics material which is based on the apparatus illustrated in FIG. 1 of British Patent Specification No. 2202181. Also, in general terms, the process of injection moulding is the same as described in that prior specification.

More particularly, a mould 9 of an injection moulding machine has upper and lower parts 11, 12 defining a mould space 13 of complex design and incorporating a rib 16. The mould parts 11, 12 are mounted between a fixed upper platen 10 and a lower platen 14 movable by a hydraulic ram 15. Also, in this embodiment, within the upper mould part 11 is a hot runner manifold 17 leading to a desired point of entry or opening 43 to the mould space 13.

A screw ram 18 is provided for introducing molten thermoplastic material 19 through a nozzle assembly 20 to the hot runner manifold 17 and hence through the opening 43 into the mould space 13. The nozzle assembly is provided with a shut-off slide valve 21 activated by a bell-crank lever 22 and a link 23 connected to a hydraulic cylinder 24. The valve 21 is shown in its closed position at the end of that part of the moulding cycle which includes the introduction of the plastics material. The closed valve 24 prevents any back flow of plastics material to the barrel of the screw ram, which may then be refilled With plastics material in preparation for the next moulding cycle.

The passage through which pressurised gas is introduced to create a gas containing cavity 25 in the plastics material 19 is the bore 28 of a retractable gas supply nozzle or valve member 26 connected to the piston not shown of a hydraulic or pneumatic cylinder 27. The downstream end of the nozzle 26 is located at a separate opening 44 in the mould space and includes a shut-off control valve comprising an axially movable valve member 31 which is held captive by a screw-on cap 32 and which will be described in detail below with reference to FIGS. 2 to 4. Pressurised gas, e.g. nitrogen, is supplied to the upstream end of the nozzle 26 from a chamber 35 by a piston and cylinder 33, 34. The chamber 35 is connected to the nozzle 26 via a solenoid operated valve 36, and to a gas supply (not shown) via a non-return valve 37 and a pressure regulator 38.

Surrounding the nozzle 26 is a second passage 51 which adjacent its inner end has a valve port 42 connected by a short passageway 52 leading to the opening 44 in the mould space 13, and provided in this embodiment by an insert 41 in the lower mould part 12. Also, in this embodiment, the outer end of the passage 51 is open to the atmosphere.

The screw-on cap 32 of the nozzle 26 comprises a frusto-conical part 53 providing an externally tapered surface 63 capable of sealing engagement with a conical valve seat 54 of the valve port 42, and a leading cylindrical part 55 adapted, in this embodiment, to protrude into the mould space through the short passageway 52. The extent to which the part 55 protrudes into the mould space when the valve port 42 is closed may be varied, or indeed the end of the part 55 may be substantially flush with the mould surface. Within a bore 56 in the cap 32 through which gas enters the mould space, there is positioned the movable valve member 31 of the shut-off valve, which valve member 31 extends longitudinally of the bore 56 which is a continuation of the bore 28 of the nozzle. At the leading end of the valve member 31 there is provided a head 57 which when the valve member 31 is withdrawn seats in a valve port 50 defined by the outlet end of the bore 56 and thereby shuts off the outlet end of the bore 56 against the ingress of plastics material filling the mould space. The head 57 also has a protruding tapered end portion, which, in this embodiment, is a cone 61, for piercing the skin of the plastics material and penetrating further into the plastics material, thereby assisting the gas to enter the plastics material to create the required cavity. The head 57 is connected to the stem 62 of the member 31 by a section 64 having a reverse taper. This section 64 assists to align the head 57 to close the valve port 50 in the outlet end of the bore 56 when the member is drawn therein. The valve member 31 also has a diamond shaped head 58 at its trailing end for engagement with a countersink surface 59 at the outlet end of the bore 28 in the nozzle 26 which stops the member 31 being withdrawn further without fully blocking off the passage 28. The valve member 31 acts as a shuttle within the bore 56 between a withdrawn position (FIG. 2), in which the trailing head 58 abuts the countersink surface 59 and the leading head 57 closes the valve port 50 in the outlet end of the bore 56, and an extended position (FIG. 3) in which the cone 61 and the head 57 penetrate the plastics material and the pressurised gas is permitted to flow through the passage formed by bores 28, 56 in series into the plastics material within the mould space 13. In both positions of the valve member 31, at least the cone 61 of the valve member protrudes into the mould space 13. A spring 60 initially urges the valve member 31 into its withdrawn or valve port closed position but can be overcome by the gas pressure when the pressurised gas is permitted to flow into the bore 28, the diamond shaped head 58 increasing the surface area against which the gas acts and allowing the gas pressure to be applied to the surface of the reverse tapered section 64. When the valve member 31 is moved by the gas pressure into its extended or valve port open position, the valve member protrudes further into the mould space 13 and penetrates deeper into the plastics material thereby assisting the pressurised gas to enter the plastics material.

Figure 3:
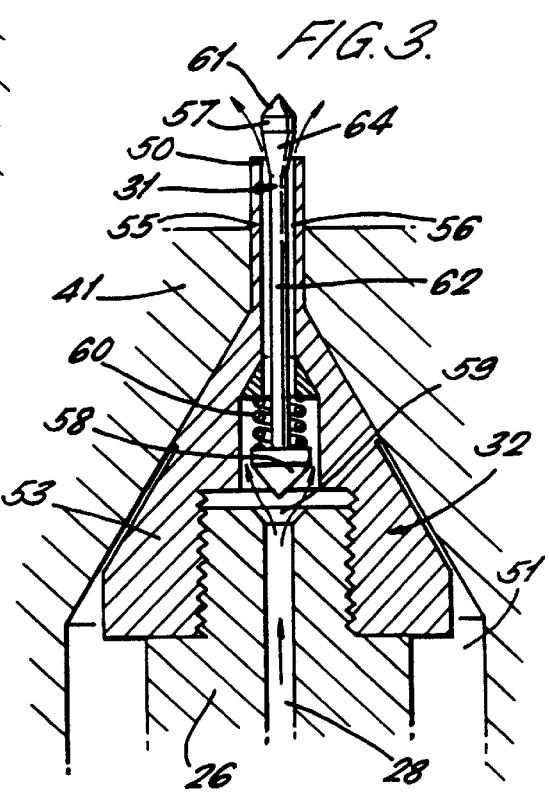
FIG. 3 shows the shut-off valve member extended by the gas pressure into its valve port open position to allow gas to enter the plastics material in the mould space.
Figure 4:
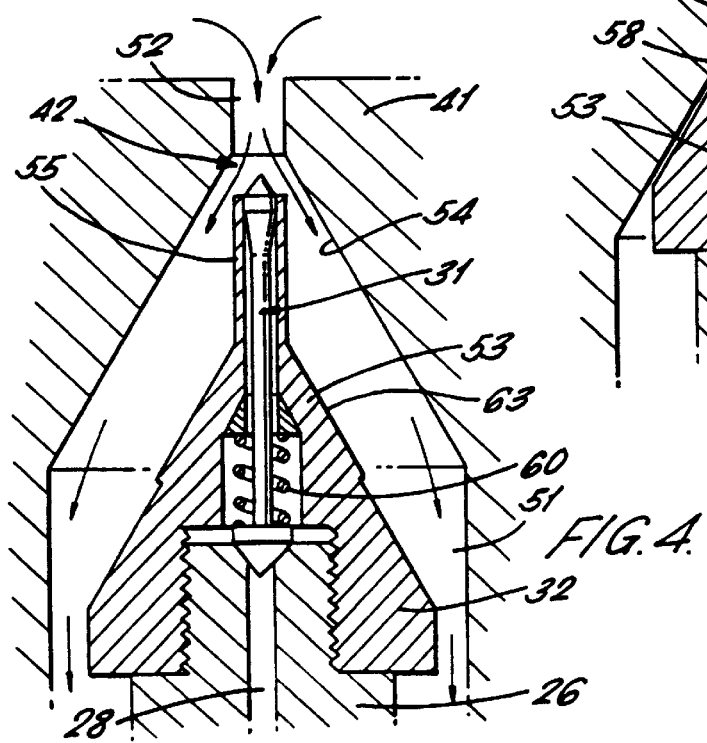
FIG. 4 shows the gas supply nozzle retracted for venting of the cavity.

The piston and cylinder combination 27 is controlled via a solenoid operated valve 40 by control means (not shown) to move the nozzle 26 between a forward position (FIGS. 1 to 3) and a withdrawn position (FIG. 4). In the forward position, the frusto-conical part 53 of the cap 32 of the nozzle or valve member 26 closes the valve port 42 and the cylindrical part 55 of the cap extends into the passageway 52. The pressure applied by the piston 29 is greater than the pressure applied by the plastics material within the mould space 13 and the back pressure of the gas which is creating the gas containing cavity 25. In the withdrawn or valve port open position of the nozzle or valve member 26, gas pressure within the cavity 25 is relieved through the opening 44, i.e. gas from the cavity readily passes through the passageway 52, the valve port 42 and the passageway 51 in succession and thereby around the nozzle 26 to the atmosphere. The valve member 31 has then been returned to its withdrawn or valve port closed position by the spring 60 and the head 57 prevents the gas passing back through the bore 56.

Figure 2:
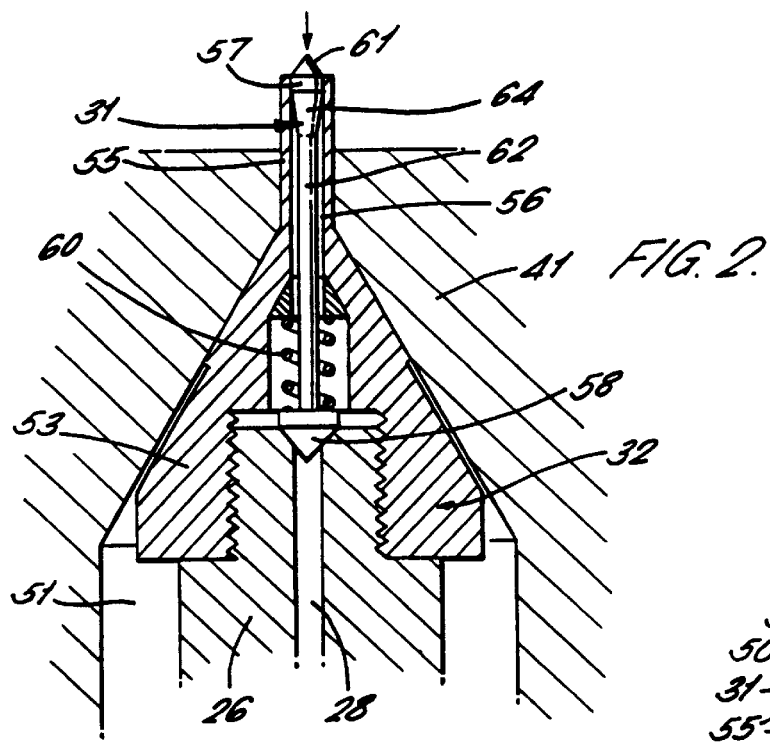
FIG. 2 is a detail sectional view of the rectractable gas supply nozzle having a passage through Which pressurised gas enters the plastics material in the mould space, the nozzle being in its valve port closed position, and the shut-off valve member in the passage of the nozzle being in its withdrawn or valve port closed position.

In operation, at the start of the moulding cycle the nozzle or valve member 26 is held forward under pressure by the piston and cylinder combination 27 thereby closing the valve port 42, and the valve member 31 is spring urged into its withdrawn or valve port closed position (FIG. 2). The screw ram 13 contains plastics material and the slide valve 21 is open. The chamber 35 is also filled with pressurised gas, and the valves 36 and 40 are both closed.

Operation of the screw ram 18 introduces the plastics material 19 into the mould space 13 through the opening 43 via the hot runner manifold 17. Simultaneously, a gas delay timer is started. At the end of this delay time, the outlet end of the nozzle 26 is covered by plastics material, but the valve member 31 is still withdrawn in its valve port closed position preventing the ingress of plastics material into the bore 56. The valve 36 is then opened and the piston and cylinder 33, 34 is operated to introduce gas through the nozzle 26. The pressurised gas moves the valve member 31 into its extended or valve port open position (FIG. 3) in which the cone 61 and the leading head 57 of the valve member 31 penetrate further the plastics material. The gas then flows through the bores 28, 56 into the plastics material within the mould space to create a gas containing cavity 25 in the plastics material. The pressurisation in the gas is maintained by the piston. and cylinder 33, 34 whereby the gas in the plastics material causes the plastics material to flow throughout the mould space with the gas containing cavity within the plastics material, the cavity thereby extending with the plastics material until the plastics material has extended over the whole of the mould space. The gas flow pressure to the cavity 25 is also maintained to hold the plastics material in the mould space positively against the mould surface as the plastics material solidifies and cools until the moulding can itself sustain the form dictated by the mould surface.

The valve 36 is closed and the piston 33 withdrawn. The cylinder 34 may be refilled with another quantity of gas under pressure.

The valve member 31 is returned by the spring 60 to its withdrawn or valve port closed position, the reverse tapered section 64 aligning the head 57 to enter the bore 56.

Furthermore, the valve 40 is reversed so that the piston 29 withdraws the nozzle 26 to open the valve port 42, the gas in the gas containing cavity passing out through the opening 44, the open valve port 42, and the second passageway 51 to the atmosphere (FIG. 4), thereby relieving the gas pressure in the cavity 25. The mould is then opened and the moulding removed. Finally, the piston and cylinder combination 27 is operated to return the nozzle 26 to its forward position (FIG. 2) to await the introduction of plastics material during the next moulding cycle.

It will be appreciated that the leading head 57 of the valve member 31 effectively prevents the passage 56, through which pressurised gas is introduced into the plastics material to fill the mould space, from becoming blocked by the plastics material.

Also, the fact that the head 57 of the valve member 31 acts to pierce the skin of the plastics material and that the valve member, at least when in its extended or valve port open position, protrudes into the mould space and penetrates the plastics material assists the pressurised gas in entering the plastics material to create the required cavity. otherwise, at least some of the gas might tend to flow back over the surface of the plastics material, i.e. between the plastics material and the mould surface, which would be detrimental to the surface finish of the moulding. This possibility is also further avoided, in the case of the present embodiment, by the cylindrical part 55 of the cap 32 protruding into the mould space 13 (see FIG. 3) during the introduction of the gas.

The invention is not restricted to the specific details of the embodiment described above. For example, there may be provided a retractable nozzle 26 of the kind described at different positions or at more than one position in the mould, in the same manner as described in relation to the embodiments of FIGS. 4 to 9 of British Patent Specification No. 2202181. Similarly, as described in the same prior specification, two or more openings may be provided through which the molten plastics material enters the mould space 13.

We claim:

1. An apparatus for producing injection mouldings, comprising:

a mould having an interior surface which defines a mould space that includes an article of manufacture mould section, and said mould having a fluid plastic introduction opening that opens out at the interior surface into said mould space, and said mould also having a gas exhaust passageway which includes a nozzle reception opening that opens out at the interior surface into said mould space at a location spaced from said plastic introduction opening;

a plastic material injection assembly which injects plastic material through said plastic introduction opening such that injected plastic material flows away from the plastic introduction opening along said interior surface;

a gas supply nozzle positioned within said gas exhaust passageway, said gas supply nozzle having a first end dimensioned for sealing receipt by the nozzle reception opening of said gas exhaust passageway;

a gas supply nozzle retraction assembly connected with said gas supply nozzle for shifting said gas supply nozzle between a plastic injection mode wherein the first end of said gas supply nozzle is received by said nozzle reception opening and extends into said mould space such that the injected plastic material passes around said first end while being prevented from entering said gas exhaust passageway and a gas escape mode wherein said first end is retracted into a gas exhaust position with respect to said nozzle reception opening, and said gas supply nozzle having an internal gas supply conduit which opens out at the first end of said gas supply nozzle;

a valve member which is positioned in the gas supply conduit of said gas supply nozzle and has a head member that is dimensioned for sealing off an outlet end of said gas supply conduit when said valve member is placed in a valve closed state, and said valve member being dimensioned so as to extend further into the plastic material within said mould space when in an open state;

a gas supply assembly which includes a gas line in communication with the internal gas supply conduit of said gas supply nozzle such that gas fed through said internal gas conduit and into contact with said valve member shifts said valve member from said valve closed state into the valve open state wherein the supplied gas penetrates the injected plastic and forms a gas cavity in the plastic material that facilitates the filling of the mould space as said nozzle reception opening is positioned at an intermediate location with respect to plastic travel along the interior surface in the mould space from the plastic introduction opening to a remote location of said article of manufacture mould section downstream, with respect to plastic travel, from both said plastic introduction opening and said nozzle reception opening, and said nozzle reception opening being positioned such that, upon a discontinuing of the gas supply, a return of said valve member to the valve closed state, and the retraction of the gas supply nozzle, the gas in the gas cavity escapes through said nozzle reception opening, past said first end of the gas supply nozzle and closed valve member and out said gas exhaust passageway, and wherein the first end of said gas supply nozzle is comprised of a frustoconical base section and a cylindrical tip, and said gas exhaust opening is defined by a corresponding frustoconical interior wall section and cylindrical wall section with the cylindrical wall section having an outlet end defining the nozzle reception opening and an axial length which is shorter than the axial length of said cylindrical tip such that said cylindrical tip extends away from the interior surface of said mould space and further into the mould space.

2. Apparatus as claimed in claim 1, wherein the valve head member is tapered to assist the valve member to penetrate the plastics material.

3. Apparatus as claimed in claim 1, wherein the valve member protrudes into the mould space also when in its valve port closed position.

4. Apparatus as claimed in claim 1, wherein a spring is provided which urges the valve member into its valve closed state.

5. Apparatus as claimed in claim 1, wherein the valve member when in its valve closed state engages a stop whereby the plastics material filling the mould space cannot retract the valve member further into the gas supply conduit.

6. Apparatus as claimed in claim 1, wherein said gas supply nozzle retraction assembly includes a piston and cylinder combination which is joined with said gas supply nozzle for moving the gas supply nozzle between a nozzle reception opening plugged state and said gas escape mode position.

7. An apparatus as recited in claim 1 wherein said head member includes a cone shaped tip and a reverse taper portion extending to said cone-shaped tip.

8. An apparatus as recited in claim 1 wherein said gas supply conduit includes an expanded portion positioned between a less expanded downstream gas supply conduit section, with respect to a direction of travel of the injected gas through said gas supply conduit, and a less expanded upstream gas supply conduit section, and said head member represents a first head member of said valve member, and said valve member further includes a second head member and a stem extending between said head members, and said apparatus further comprising a spring member in contact with said second head member so as to urge the second head member into an abutting relationship with an opening of said less expanded upstream gas supply conduit section, and said stem being of a length such that said first head member is in a sealing relationship with a free end of said gas supply nozzle when said second head member is in said abutting relationship.

9. An apparatus as recited in claim 1, wherein said frustoconical base section and said cylindrical tip form a screw on cap, and said gas supply nozzle further comprises a shaft which has a threaded end for receiving said screw on cap, and said shaft being connected to a piston/cylinder assembly forming a component of said retraction assembly.

10. An apparatus as recited in claim 1, further comprising biasing means for biasing said valve member into the valve closed state, and wherein said valve member includes an elongated intermediate member extending off from said head member, and said valve member being dimensioned such that, when in the valve open state, said head member and a portion of said intermediate member extend off from said first end of said gas supply nozzle so as to extend even deeper into said mould space such that initial filling of said mould space through use of an expanding gas cavity is facilitated.

11. An apparatus as recited in claim 1, wherein said gas exhaust passageway extends in a straight fashion from the nozzle reception opening to an exhaust outlet end which opens to the atmosphere and said exhaust passageway shares a common central axis with said gas supply nozzle.

12. An apparatus as recited in claim 1, wherein said gas supply nozzle reception opening of said gas exhaust passageway is positioned closer to said plastic introduction opening than to said remote location which is last to come in contact with the plastic material.

* * * * *